United States Patent [19]
Stebbins

[11] 4,064,435
[45] Dec. 20, 1977

[54] RADIAL OPTICAL ENCODER APPARATUS FOR SHAFT ANGLE MEASUREMENT

[75] Inventor: William J. Stebbins, West Severna Park, Md.

[73] Assignee: The United States of America as represented by the Secretary of the Air Force, Washington, D.C.

[21] Appl. No.: 737,119

[22] Filed: Oct. 29, 1976

[51] Int. Cl.² .............................................. G01D 5/34
[52] U.S. Cl. .......................... 250/231 SE; 340/347 P
[58] Field of Search .................... 340/347 P; 356/169, 356/170; 250/231 R, 231 SE, 231 GY, 237 G, 216; 324/175

[56] References Cited

U.S. PATENT DOCUMENTS

| 1,878,658 | 9/1932 | Aronoff | 324/175 |
| 2,685,083 | 7/1954 | Beman | 250/231 SE |

Primary Examiner—David C. Nelms
Attorney, Agent, or Firm—Joseph E. Rusz; William Stepanishen

[57] ABSTRACT

A radial optical encoder apparatus utilizing a pair of diametrically-opposite optical encoders in conjunction with a rotating faceted mirror for precision measurement of rotary shaft angles.

8 Claims, 10 Drawing Figures

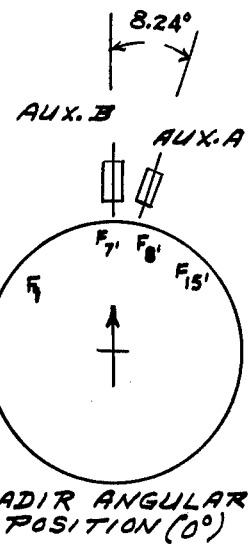
FIG.6a — NADIR ANGULAR POSITION (0°)
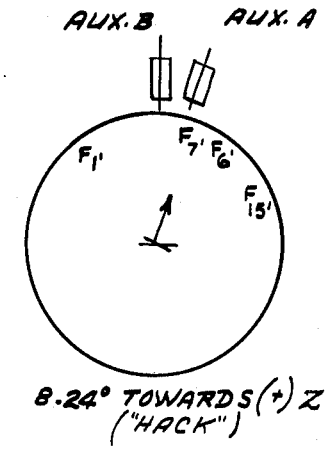
FIG.6b — 8.24° TOWARDS (+)Z ("HACK")
"NADIR OUT" = AUX.A AND AUX.B AND FIDUCIAL
"CONTROL OUT" = AUX.A AND AUX.B AND FIDUCIAL
("CONTROL OUT" IS HACK) +1018's (-) 1018's
F8' TO F7' = 8° 14' 38"
F8' TO F15' = 57° 28' 55"
F8' TO F7' = 57° 28' 55"
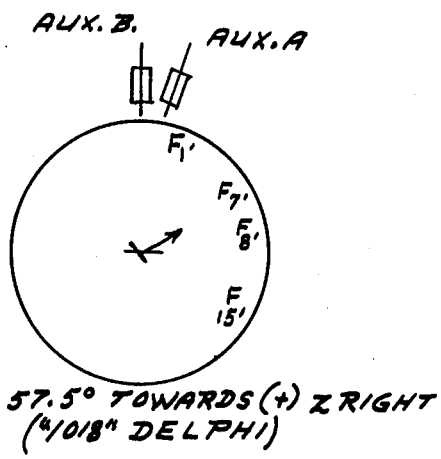
FIG.6c — 57.5° TOWARDS (+)Z RIGHT ("+1018" DELPHI)
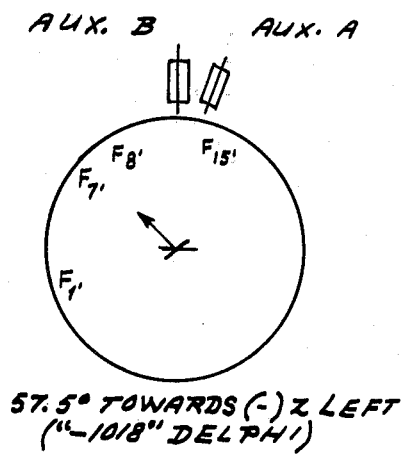
FIG.6d — 57.5° TOWARDS (-)Z LEFT ("-1018" DELPHI)

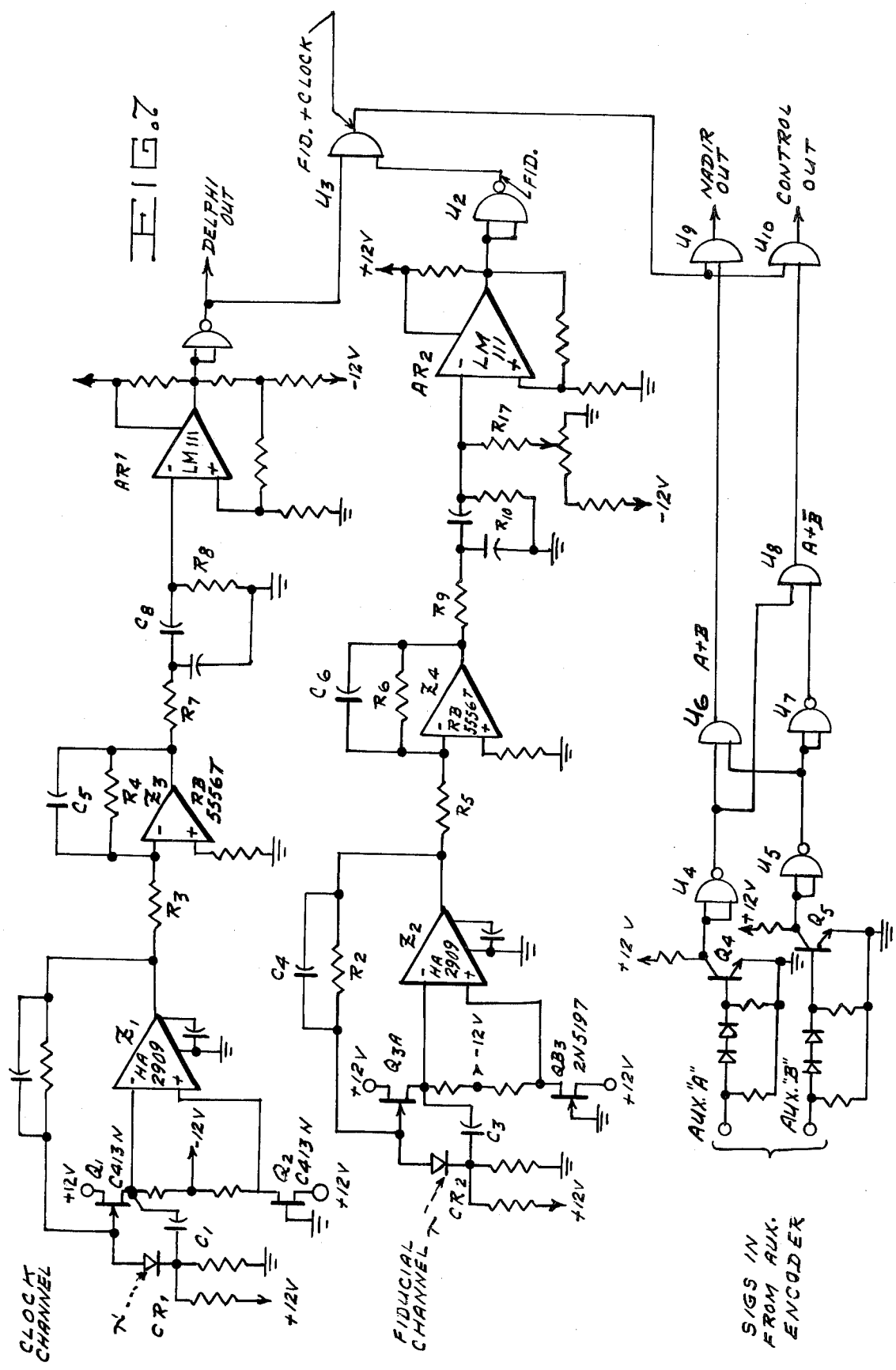

RADIAL OPTICAL ENCODER APPARATUS FOR SHAFT ANGLE MEASUREMENT

STATEMENT OF GOVERNMENT INTEREST

The invention described herein may be manufactured and used by or for the Government for governmental purposes without the payment of any royalty thereon.

BACKGROUND OF THE DISCLOSURE

The present invention relates broadly to a shaft position encoder system, and in particular to a radial optical encoder apparatus for precision shaft angle measurements.

In the prior art, the most frequently utilized conventional optical encoders which were used to measure shaft angles usually required code discs or code drums. The use of code discs/drums dictated the need for a very close spacing and positional stability between the code pattern material and, either or both, the light source and the sensor. Furthermore, the operation of the prior art encoding system, generally, depended upon the use of a reflective or transmissive code wheel. The present invention provides an optical encoder apparatus which is capable of precision measurements in an environment of relatively large end play, in/out radial shifts, side to side translations and some angular shifts in axes.

SUMMARY

The present invention utilizes a radial optical encoding apparatus having a reflective faceted ring mirror, a fine optical encoder with two signal channels, the processing electronics, and a coarse optical encoder with two channels for precision measurements of rotary shaft angles. Since the present optical encoder apparatus uses a rotating faceted mirror for 1 milliradian least significant bit resolution, only four source/detector tracks are required rather than thirteen tracks as in previous standard approaches. The use of a two channel main encoder provides a system which is tolerant of shaft linear translations of at least 0.100 inch along the shaft axis, and also radial linear translations of the shaft of at least 0.05 inch in each of two orthogonal axis. An auxiliary encoder for coding of key points allows all polygon mirror facets to be untilted; consequently, the accuracy of the Delphi signal is better by four times than a three channel encoder system. The present encoder apparatus uses 15 mirror facets rather than 13 which allows 14 smaller intervals of 8.2° each interval instead of 12 larger intervals of 9.6° each, thus, the lenses work over a smaller field angle and the Delphi signal is more accurately linear.

It is one object of the present invention, therefore, to provide an improved radial optical encoder apparatus utilizing a reflective faceted ring mirror for precision measurements of rotary shaft angles.

It is another object of the invention to provide an improved radial optical encoder apparatus capable of radial linear translations of the shaft of at least 0.05 inch in each of two orthogonal axis.

It is yet another object of the invention to provide an improved radial optical encoder apparatus wherein in the main encoder utilizes only two signal channels.

These and other advantages, features and objects of the invention will become more apparent from the following description taken in connection with the illustrative embodiment in the accompanying drawings.

BRIEF DESCRIPTION OF THE DRAWINGS

FIGS. 6a – 6d are top views of the auxiliary encoder key alignments, and, FIG. 7 is a schematic diagram of the signal processing unit for the optical encoding apparatus.

DESCRIPTION OF THE PREFERRED EMBODIMENT

Figure 1:
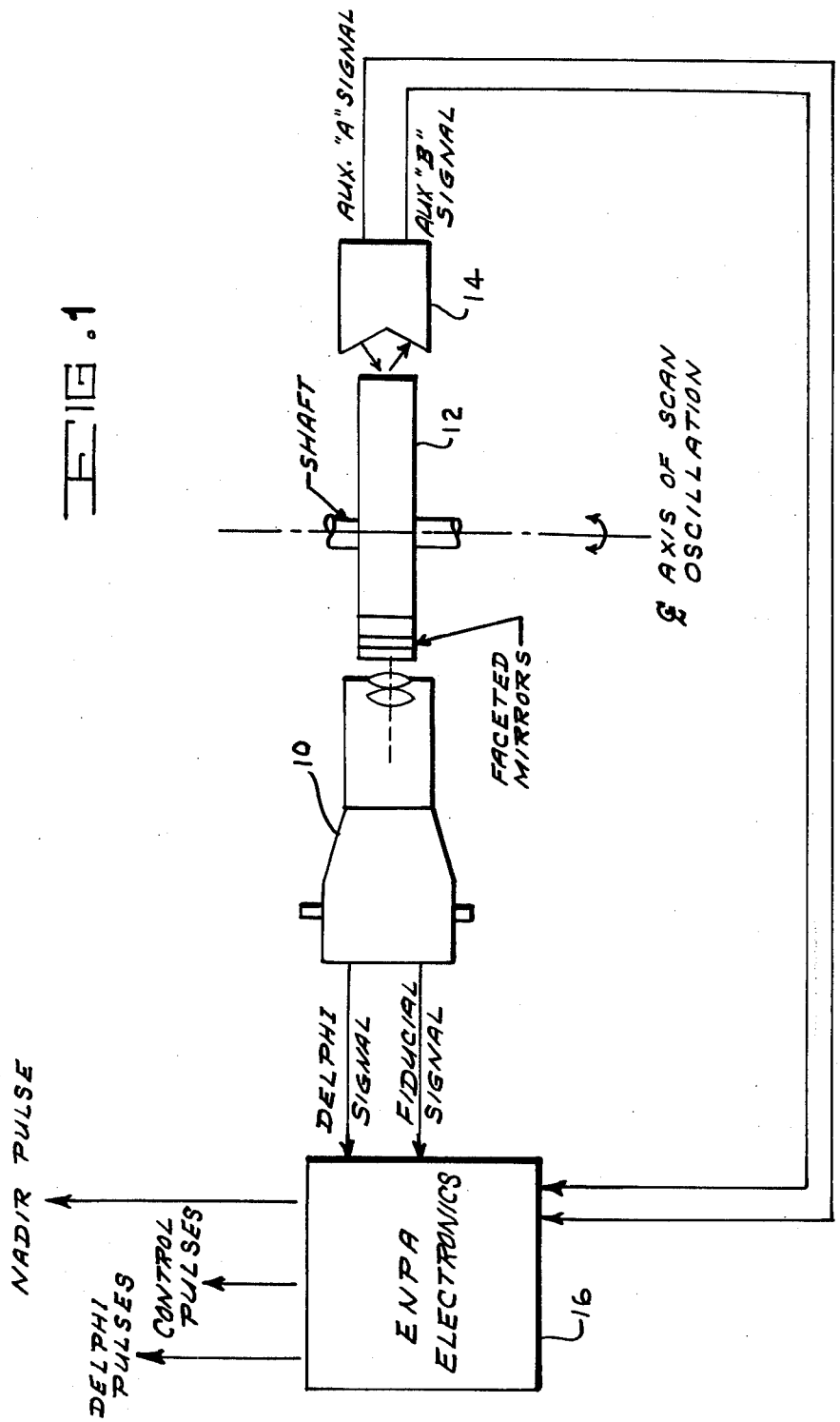
FIG. 1 is a block diagram of the radial optical encoder apparatus in accordance with the present invention.

Referring now to FIG. 1, there is shown a block diagram of the radial mode optical encoder system wherein the encoder system may be custom tailored for a specific sinusoidal shaft scan application, such as a situation where the peak scan angle is ±57.85° (±1024.5 Delphi pulses). However, a larger or smaller scan angle may be accommodated by using the present encoder system by merely increasing or decreasing the number of mirror facets. A unidirectional shaft rotation may also be measured by this encoder system by increasing the mirror facets to a full 360° ring of facets, keeping on exact integral multiple of the Delphi angle for each facet and moving the auxiliary encoder along the shaft to a new plane parallel to the faceted mirror plane or by using two holes in the faceted mirror plane for the auxiliary encoder two light emitting diodes (ED) and detector channels.

The relationship of the main encoder optics assembly 10, the faceted polygon ring 12 on the shaft, and the auxiliary encoder assembly 14 and the encoder electronic unit 16 are shown in FIG. 1. The encoder preamplifier (ENPA) electronics which is contained in encoder electronic unit 16 receives two signal currents from the photodiode detectors in the main optical encoder 10 and two voltage signals from the photodiode/operational amplifier channels of the auxiliary encoder 14. The ENPA amplifies, thresholds, and decodes these signals into the required three output signals.

Figure 2:
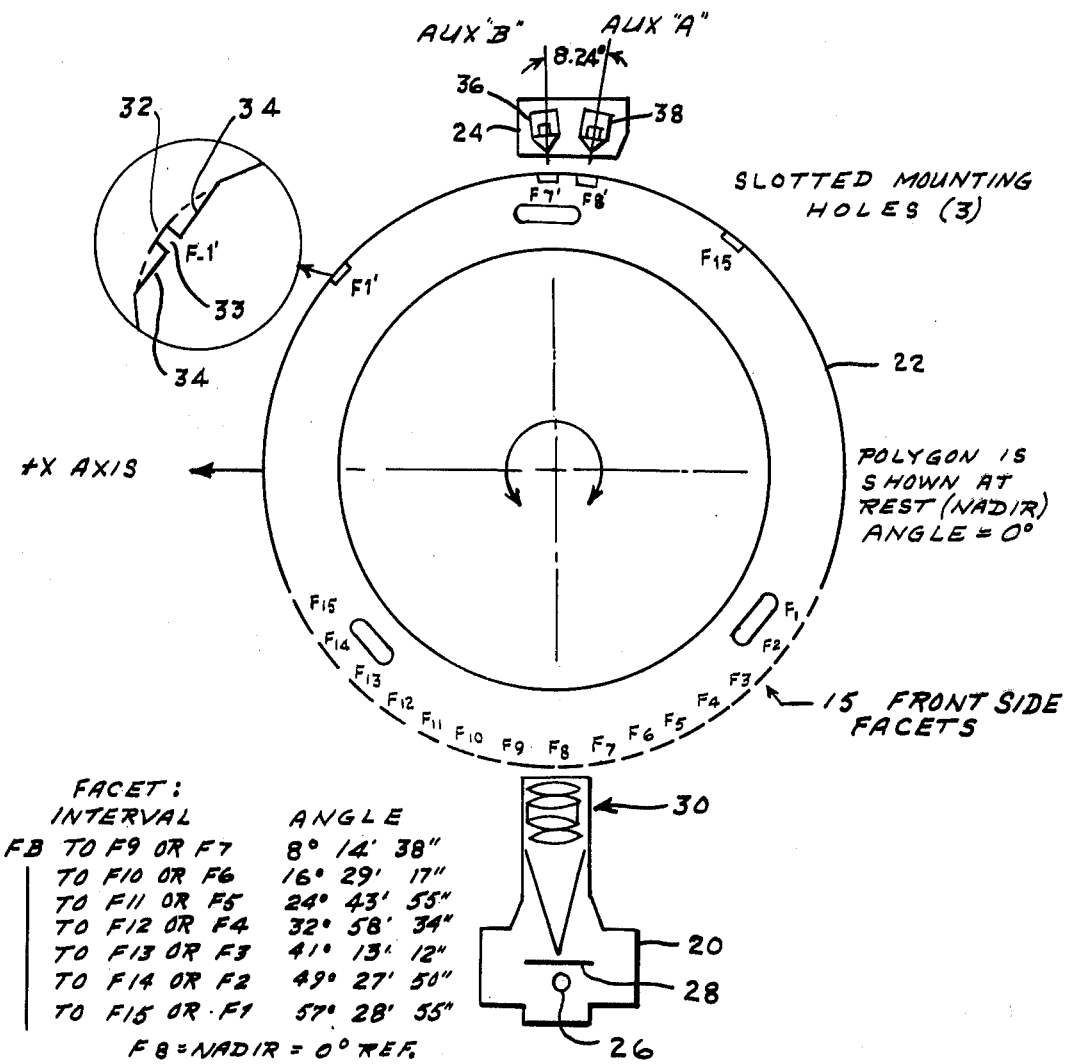
FIG. 2 is a top view of the main optical encoder.

There is shown in FIG. 2 a top view of the main optical encoder 20, the multi-faceted polygon ring 22, and the auxiliary encoder 24. The main optical encoder 20 comprises a pair of source light emitting diodes (LED) 26, a reticle/detector unit 28, and a plurality of lenses 30. The multifaceted polygon ring 22 has a plurality of facets F1–F15 disposed on the front side of the ring. Facet F1 which is shown in an expanded view shows in greater detail the facet structure that comprises a mirror 32 on an elevated portion 33 of the ring 22 and an area of black mask 34 surrounding the elevated portion 33. The auxiliary encoder 24 comprises a pair of led-detector units 36, 38 disposed in the encoder assembly at a predetermined angle to each other.

The outputs of the main optical encoder 20 are derived from the signal variations experienced by two photo detectors which receive image light through a reticle mask. The variations are caused to be proportional to scan angle by reflecting the light from optically flat mirror surfaces F1 – F15 (facets) on the polygon ring 22 which is attached to the shaft of the oscillating scanner. The main optical encoder 20 operates in conjunction with the series of 15 front facet-centered fiducial pulses (FID's). The auxiliary encoder along with a series of four facets (F1', F7', F8', F15') on the rear side of the faceted polygon ring 22 produces pulses which are used for logical gating the proper FID pulses to generate the Nadir, Hack, +1018, and −1018 Control pulses.

Figure 3:
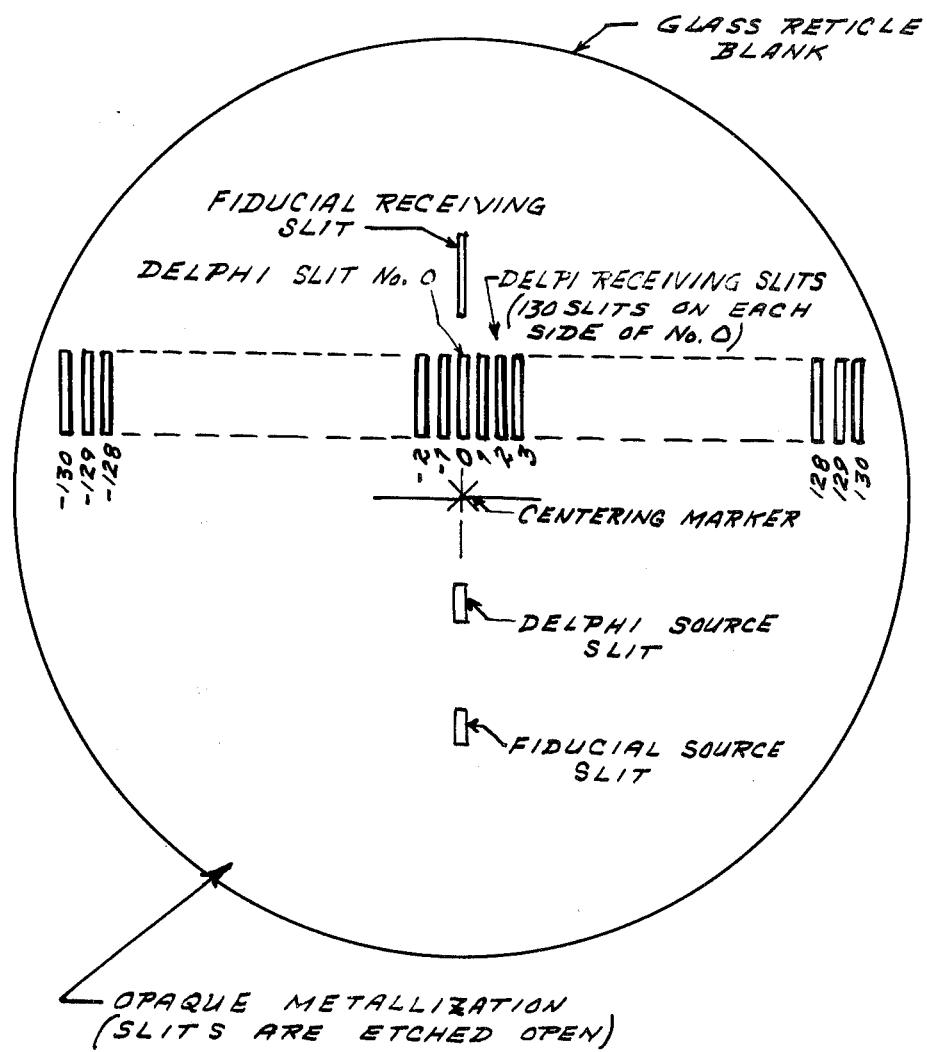
FIG. 3 is a front view of the main optical encoder reticle pattern.
Figure 4:
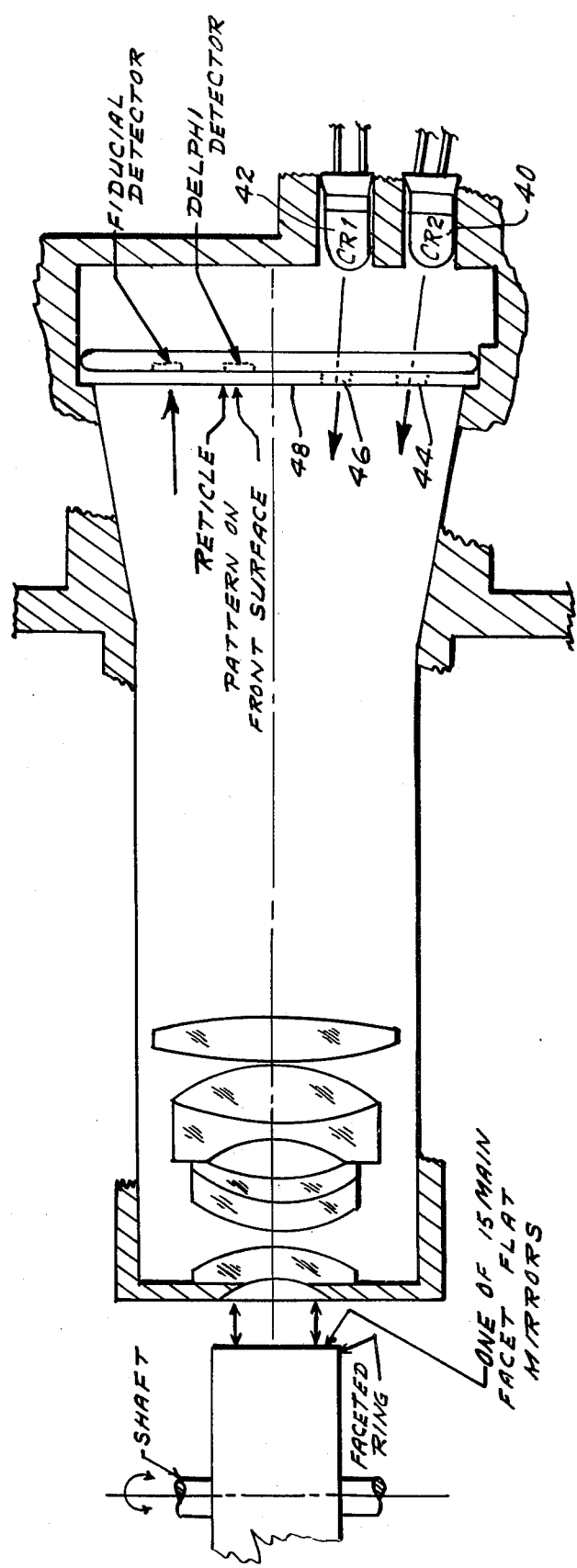
FIG. 4 is a side view of the main optical encoder apparatus.

There is shown in FIG. 3 the reticle pattern which is used in the main optical encoder which is shown in greater detail in FIG. 4. The main encoder has eight emitting diodes 40, 42 (L.E.D.'s): one behind the fiducial source slit 44 and one behind the Delphi source slit 46. The reticle/detector assembly 48 contains a small silicon photodiode detector behind the FID Detector Slit; this receives FID source slit only when one of the 15 polygon mirror facets is normal to the optical encoder axis. The Delphi LED emits light through the Delphi source slit of the reticle. This is collimated by the encoder lens, reflected by the polygon facet, passes back through the lens, and is imaged onto the Delphi reticle receiving slit array. Light is received by the long Delphi Silicon photodiode when the image passes through an open slit of the Delphi reticle, and is blocked when the image falls on an opaque bar of the reticle. Between the normal to one facet and the normal to the next facet there are 146 Delphi pulses except between Facets 1 to 2 and Facets 14 to 15 where there are 142 Delphi pulses. Thus, the total Delphi pulse count from Facet 8 normal (Nadir) to facet 1 normal or 15 normal is 1018. The facets of the polygon are integral multiples of 0.985512 mrad so that images returned simultaneously from adjacent facets are combined in phase (e.g., at Delphi No. 73; the return from one facet is imaged on slit No. −73 while the return from the adjacent facet is imaged on slit No. +73). Accurate initial focal length adjustment is necessary to achieve in-phase combining. The angle between polygon facets is accurate to ±5 arc sec and sharp "corners" form the intersection of two adjacent facets. The main optical encoder maximum error from perfect accuracy is below 10 arc sec. The encoder lens, which has six elements, provides collimation, flat field correction at the image plane, and an intentional "distortion" in the image height (Delphi pulse count) function resulting in a linear relationship between distance from zero and shaft angle.

The two main encoder silicon detectors are each coupled to low-noise, high-gain preamplifiers as an input current. The two signals are further amplified, filtered, and then each sent to a threshold crossing detector (comparator) circuit which has a small hysteresis band. The ENPA electronics also has the logic use the two Auxiliary signals with the FID pulses to form the "Nadir Out" and "Control Out" signals to the rest of the spacecraft system.

The LED's are visible red Fairchild FLV-104's having an integral lens that causes the emitted light to nearly converge, to a 4° cone angle which is only slightly less than the angle of the encoder lens. A further improvement in the optical encoder apparatus is the use of Si: Ga As near infrared wavelength LED's since these provide higher LED output intensity and also are at the spectral peak sensitivity of the silicon photodiode detectors which will increase encoder SNR by an additional factor of six.

Figure 5:
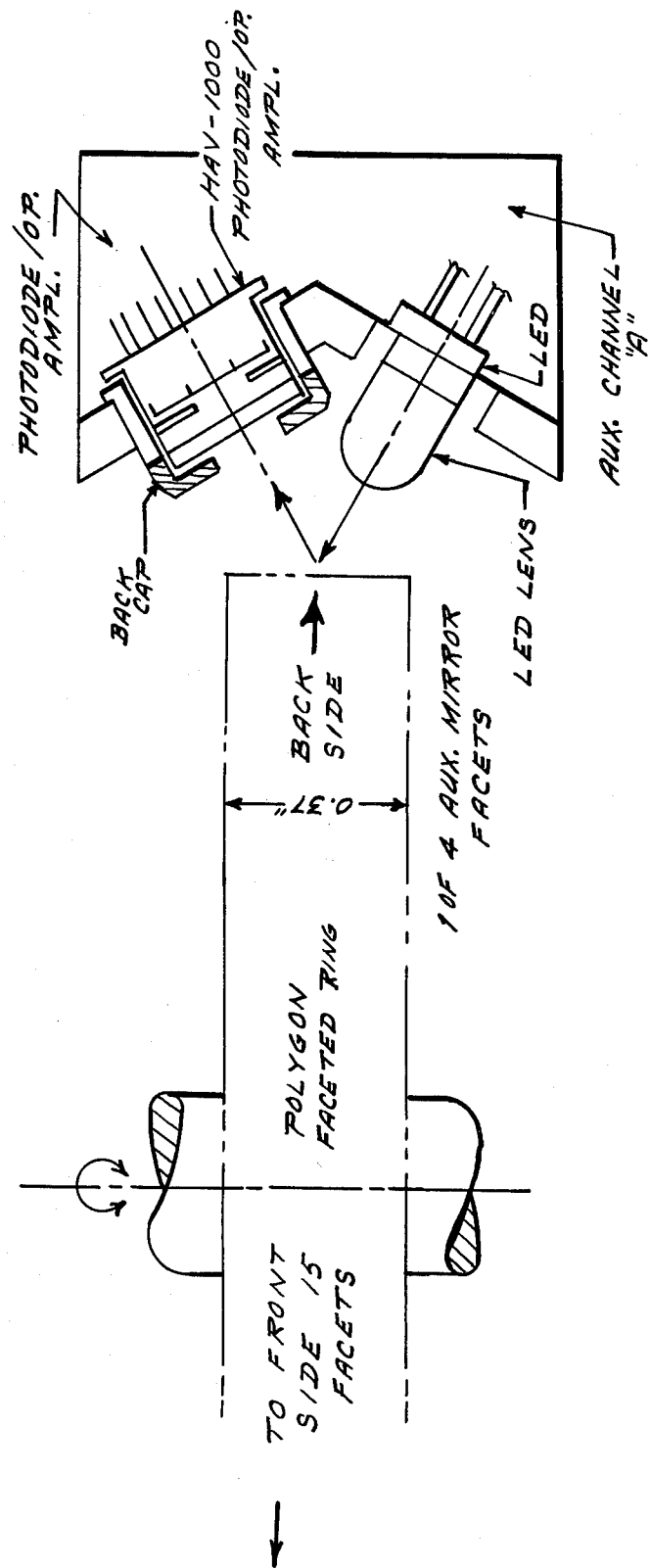
FIG. 5 is a side view of the auxiliary encoder apparatus.

The auxiliary encoder has two channels, AUX A and AUX B, to decode which of the 15 FID pulses is 1018 (Facet 1), −1018 (Facet 15), Nadir (Facet 8), and Hack (Facet 7). There is shown in FIG. 5 a side view of one of the auxiliary channels. In FIGS. 6a −6d are shown the polygon with its four auxiliary Facets (F1¹, F7¹, F8¹, and F15¹) in the four key rotational positions illustrating the alignment with the AUX A and AUX B channels for decoding the FID's. An LED with its own lens reflects from the auxiliary facet mirror and energizes a photodiode and operational amplifier. The AUX A and AUX B pulses are quite broad, (approximately 3° wide) with large amplitudes to gate particular FID's into the nadir and control logic circuitry. The center of the Nadir pulse is coincident with the center of the zeroth pulse of the Delphi channel. The other fourteen Fiducial pulse centers are also coincident with their corresponding facet normal zero Delphi pulses. The Hack mark Fiducial from Facet No. 7 is used to detect scan direction and is coincident with the 146th Delphi pulse from nadir on the +Z side of scan.

At the Nadir angle both AUX A and AUX B are enabled as both F7' and F8' are aligned with their associated LED/detector combinations. At the "Control" angles the backside mirror of F7' or F8' or F15' is aligned with AUX A and AUX B is dark as there is no mirror aligned. The polygon ring is painted flat black between mirrored AUX facets, and at the outside ends of main facets F1 and F15. The AUX A and AUX B signal is angularly sharpened by logically AND'ing it with the Fiducial pulse for Nadir. Similarly AUX A AND NOT AUX B signal is angularly sharpened by the Fiducial pulse for the Control pulses. In effect, the Auxiliary Optical encoder design flags certain Fiducial pulses to allow selection of the desired key Fiducial pulses out of the 15 Fiducial pulses.

Turning now to FIG. 7 there is shown the simplified signal processing schematic. The Clock channel photodiode CR1 current flows into the transimpedance amplifier Q1, Q2, Z1 and associated components. Bootstrap drive of the photodiode capacitance is provided from Q1A JFET source follower source through C1. The load impedance of the first stage is R1 in parallel with C2. The output signal voltage of Z1 is then amplified by the gain of ten in Z3, the second stage. Following the second stage R7 with C7 form a single pole low-pass filter and C8 with R8 form a high pass filter which blocks the steady dc offset voltage which is principally due to dark leakage of the large clock photodiode. The Fiducial Channel signal processing is very similar, where Q3A and Q3B form the dual JFET source follower. The output of first operational amplifier Z2 feeds the second stage Z4 with a voltage gain of 10. A low pass RC filter followed by a high pass RC filter is again provided for noise filtering and dc offset rejection.

The clock signal output of the low pass-high pass filter is applied to threshold AR1. The Fiducial signal from the low pass filter is applied to threshold AR2; both circuits are LM 111 comparators. The FID channel rides on an adjustable dc level from the 2k ohm potentiometer in order to set the FID waveform baseline level lower than the ac coupling would do to the waveform in order to place the threshold at the approximate middle of the FID pulse amplitude. Both threshold circuits have positive feedback or hysteresis applied in order to suppress comparator oscillations.

The output of comparator AR1 is NAND'ed by U1 to provide the Delphi Out logic level signal. Gate U2 output is the logic level Fiducial pulse. Gate U3 AND's these together to narrow and reduce skew between the clock (zero clock pulse) and the FID pulse. The Auxiliary A signal from the Auxiliary Encoder Assembly photodiode/operational amplifier output feeds inverting saturating switch Q4 then NAND gate U4. Similarly the Auxiliary B signal from the Auxiliary Encoder feeds switch Q5, then gate U5. the output of AND gate U6 is A AND B. This signal is gated with (FID AND Clock) by AND gate U9 to form the Nadir Out pulse signal. The AUX logic signal out of gate U5 is inverted by NAND Gate U7, then is AND'ed by gate U8 to form (A B). This signal is combined with (FID AND Clock) by AND Gate U10 to form the Control Out pulse signal.

Although the invention has been described with reference to a particular embodiment, it will be understood to those skilled in the art that the invention is capable of a variety of alternative embodiments within the spirit and scope of the appended claims.

What is claimed is:

1. A radial optical encoder apparatus for shaft angle measurement comprising in combination:
    a shaft capable of rotation about its central axis, said shaft having a ring radially disposed thereon, said ring having a plurality of faceted surfaces disposed on it's outer surface parallel to said shaft central axis, said faceted surfaces being positioned in a predetermined pattern,
    a first optical encoder means positioned substantially perpendicular to said shaft, said first optical encoder means detecting angular rotation in said shaft position, said first optical encoder means converts said angular rotation into a pair of electrical output signals, said pair of electrical output signals being representative of said shaft position,
    a second optical encoder means positioned diametrically opposite said first optical encoder means, said second optical encoder means cooperating with said ring to provide a pair of auxiliary signals, and,
    an electronic processing means receiving said pair of electrical output signals and said pair of auxiliary signals, said electronic processing means decoding both pairs of input signals to provide three output signals.

2. A radial optical encoder apparatus as described in claim 1 wherein said first optical encoder means comprises in combination:
    a cylindrical housing having a first and second opening, said cylindrical housing being hollow, said cylindrical housing having a central axis which is perpendicular to said central axis of said shaft,
    a first and second light source mounted in said first opening of said cylindrical housing, said first and second light source emitting respectively a first and second light beam,
    a reticle means mounted in said first opening in front of said first and second light source, sad reticle means being centered on said central axis of said cylindrical housing, said reticle means being a glass blank with an opaque metalization on its surface, said reticle means having a plurality of slits disposed therein, said plurality of slits being arranged in a predetermined pattern,
    a plurality of lenses positioned within said cylindrical housing near said second opening, said plurality of lenses directing said first and second light beams to a focal point at a predetermined distance from said second opening, and,
    a first and second detector means receiving said first and second light beams, said first and second detector means respectively converting said first and second light beams to a pair of electrical output signals.

3. A radial output encoder apparatus as described in claim 1 wherein said plurality of facets comprise a plurality of flat mirrors.

4. A radial optical encoder apparatus as described in claim 2 wherein said first and second light source and said first and second detector means respectively are at a predetermined angle with respect to each other.

5. A radial optical encoder apparatus as described in claim 1 wherein said first optical encoder means resolves linear shaft translations of 0.100 inch along the shaft axis.

6. A radial optical encoder apparatus as described in claim 1 wherein said first optical encoder means resolves radial linear translations of 0.05 inch in each of two orthogonal axis.

7. A radial optical encoder apparatus as described in claim 1 wherein said first optical encoder means provides fine shaft angle resolution.

8. A radial optical encoder apparatus as described in claim 1 wherein said second optical encoder means provides coarse shaft angle resolution.

* * * * *